US009487090B2

(12) United States Patent
Zhang et al.

(10) Patent No.: US 9,487,090 B2
(45) Date of Patent: Nov. 8, 2016

(54) DUAL ENERGY STORAGE SYSTEM FOR MICRO HYBRID VEHICLES (71) Applicant: Johnson Controls Technology Company, Holland, MI (US)

(72) Inventors: Qi Zhang, Milwaukee, WI (US); Brian Christopher Sisk, Mequon, WI (US)

(73) Assignee: Johnson Controls Technology Company, Holland, MI (US)

( * ) Notice: Subject to any disclaimer, the term of this patent is extended or adjusted under 35 U.S.C. 154(b) by 239 days.

(21) Appl. No.: 13/666,380

(22) Filed: Nov. 1, 2012

(65) Prior Publication Data

US 2013/0116889 A1    May 9, 2013

Related U.S. Application Data (60) Provisional application No. 61/555,308, filed on Nov. 3, 2011.

(51) Int. Cl.
| | |
|---|---|
| *B60L 11/18* | (2006.01) |
| *H02J 1/10* | (2006.01) |
| *B60L 1/12* | (2006.01) |
| *B60L 11/12* | (2006.01) |
| *B60L 7/12* | (2006.01) |
| *G05B 15/02* | (2006.01) |
| *H02J 7/00* | (2006.01) |

(Continued)

(52) U.S. Cl.
CPC .. *B60L 1/12* (2013.01); *B60L 7/12* (2013.01); *B60L 11/12* (2013.01); *B60L 11/1811* (2013.01); *B60L 11/1861* (2013.01); *B60L 11/1868* (2013.01); *H02J 1/08* (2013.01); *H02J 7/1438* (2013.01); *H02J 7/1446* (2013.01); *B60L 2210/10* (2013.01); *B60L 2240/547* (2013.01); *B60L 2240/549* (2013.01); *H02J 7/0054* (2013.01); *H02J 2001/008* (2013.01); *Y02T 10/7005* (2013.01); *Y02T 10/7044* (2013.01); *Y02T 10/7066* (2013.01); *Y02T 10/7072* (2013.01); *Y02T 10/7077* (2013.01); *Y02T 10/7216* (2013.01); *Y02T 10/92* (2013.01); *Y02T 90/127* (2013.01); *Y02T 90/14* (2013.01)

(58) Field of Classification Search
None
See application file for complete search history.

(56) References Cited

U.S. PATENT DOCUMENTS

| 7,952,223 B2 | 5/2011 | Masson et al. |
|---|---|---|
| 8,531,053 B2 | 9/2013 | Choi et al. |

(Continued)

FOREIGN PATENT DOCUMENTS

| EP | 2353920 A1 | 8/2011 | |
|---|---|---|---|
| JP | WO 2011099116 A1 * | 8/2011 | ............ B60L 11/005 |
| WO | WO 2013/067292 A2 * | 5/2013 | ............ B60L 11/18 |

OTHER PUBLICATIONS

Hammerschmidt, Split-voltage E/E Architecture Takes Shape, Jun. 27, 2011, Technology News.*

(Continued)

*Primary Examiner* — Calvin Cheung
*Assistant Examiner* — Kevin P Mahne
(74) *Attorney, Agent, or Firm* — Fletcher Yoder, P.C.

(57) ABSTRACT

An energy storage system of a vehicle includes a first energy storage device and a second energy storage device, a voltage and current regulator device coupled to the first and second energy storage devices, a control unit for controlling the regulator device, and a plurality of sensing devices for sensing current input signals and voltage input signals to at least one of the first and second energy storage devices.

18 Claims, 5 Drawing Sheets

(51) Int. Cl.
  *H02J 7/14* (2006.01)
  *H02J 1/08* (2006.01)
  *H02J 1/00* (2006.01)

(56) References Cited

U.S. PATENT DOCUMENTS

| | | | |
|---|---|---|---|
| 2005/0067200 A1* | 3/2005 | Jiang et al. | 180/65.2 |
| 2006/0058897 A1* | 3/2006 | Senda et al. | 700/22 |
| 2007/0124037 A1* | 5/2007 | Moran | 701/22 |
| 2008/0011528 A1* | 1/2008 | Verbrugge et al. | 180/65.2 |
| 2010/0181959 A1* | 7/2010 | Gibbs et al. | 320/104 |
| 2010/0201304 A1* | 8/2010 | Chemin | 318/806 |
| 2010/0244782 A1* | 9/2010 | Nagayama et al. | 320/162 |
| 2010/0298088 A1* | 11/2010 | Rouis et al. | 477/3 |
| 2011/0115288 A1* | 5/2011 | Lee | 307/10.1 |
| 2011/0160955 A1* | 6/2011 | Chen et al. | 701/36 |
| 2011/0198920 A1* | 8/2011 | Komuro et al. | 307/10.1 |
| 2012/0062186 A1* | 3/2012 | Dessirier et al. | 320/167 |
| 2012/0105020 A1* | 5/2012 | Scott et al. | 322/28 |
| 2012/0299377 A1* | 11/2012 | Masuda | B60L 11/005 307/10.1 |
| 2013/0026823 A1* | 1/2013 | Fetzer et al. | 307/9.1 |

OTHER PUBLICATIONS

WIPO, PCT International Search Report on Patentablity Appl No. US2012/063227, May 6, 2014.*
English machne translation of Masuda, WO 2011/099116A, Dec. 11, 2015 machine translation via Google translator.*
European Patent Office, International Searching Authority, International Search Report and Written Opinion for PCT/US12/63227, mailed Aug. 27, 2013, 11 pages.
CN 201280064495.3 Second Office Action mailed Jun. 28, 2016.

* cited by examiner

DUAL ENERGY STORAGE SYSTEM FOR MICRO HYBRID VEHICLES

CROSS-REFERENCE TO RELATED APPLICATIONS

The present application claims priority under 35 U.S.C. §119(e) to U.S. Provisional Patent Application Ser. No. 61/555,308, filed Nov. 3, 2011, which is incorporated herein by reference in its entirety.

BACKGROUND

Unless otherwise indicated herein, the materials described in this section are not prior art to the claims in this application and are not admitted to be prior art by inclusion in this section.

In view of environmental concerns, alternatives to vehicles that use standard internal combustion (IC) engines include electric vehicles, hybrid electric vehicles, and micro hybrid vehicles. Conventional electric and hybrid electric vehicles have been found to be limited by their electric energy systems that supply power to their electric motor/generator and vehicle accessories. Typically, an electric motor is powered by an energy source that needs to store energy suitable for high-power discharges as well as for electric demands generated by various driving conditions.

In addition to environmental concerns, the need for increased fuel economy, increased electrical loads and better energy management has driven major original equipment manufacturers (OEMs) to consider start stop functions with regeneration functionalities in their vehicles. The start stop function could reduce the fuel consumption during stops while braking energy recuperation provides extra fuel economy benefit. To fully utilize the regeneration electric energy, currently lead acid batteries do not provide enough charge acceptance for the start stop application.

The micro hybrid vehicles promise to be more fuel efficient than gasoline-run, electric, and hybrid vehicles. Micro hybrids or stop-start cars are so named because their combustion engines are turned off when the cars stop, say, at an intersection when the light turns red. They rely on batteries to keep the accessories, such as air conditioning, radio and other electronics, running during the stop as well as to kick-start the engines after the light turns green.

Therefore, it is desirable to equip micro hybrid vehicles with energy storage systems having improved charge acceptance.

SUMMARY

Disclosed herein are improved a method and system for suggesting keywords to third party content providers based on image contents.

In one aspect, an embodiment of an energy storage system of a vehicle includes a first energy storage device and a second energy storage device, a voltage and current regulator device coupled to the first and second energy storage devices, a control unit for controlling the regulator device, and a plurality of sensing devices for sensing current input signals and voltage input signals to at least one of the first and second energy storage devices.

In another aspect, the first and second energy storage devices, the voltage and current regulator device, the control unit, and the plurality of sensing devices are configured for a micro hybrid application.

In yet another aspect, a micro hybrid vehicle includes a vehicle operation unit for determining operation modes of the micro hybrid vehicle, and generating controlling signals corresponding to the operation modes, and the above-introduced energy storage system configured to receive the controlling signals.

In yet another aspect, a computer-implemented method is provided for controlling a transfer of electrical power between a first and second energy storage devices associated with an energy storage system of a micro hybrid vehicle, the energy storage system having a vehicle operation unit, a control unit, and a voltage and current regulator device. The method includes determining an operation mode of the micro hybrid vehicle, wherein the operation mode is one of a cranking mode, a charge mode, a discharge mode, and a key-off mode, determining a status of charge of each one of the first and second energy storage devices, and generating and communicating to the voltage and current regulator device an activation signal or a deactivation signal based the determined operation mode and the determined respective status of charges of the first and second energy storage devices.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

As stated above, micro hybrid vehicles promise to be more fuel efficient than gasoline-run, electric, and hybrid vehicles. Moreover, micro hybrid vehicles make an attractive option for several reasons: their designs don't require the kind of fundamental modifications that carmakers have had to carry out for plug-in hybrid or all-electric vehicles. Although unlike for electric vehicles, engine shut-offs are noticeable, consumers won't need to spend as much time getting used to driving cars that are very different than the conventional gasoline cars. Micro hybrid vehicle design is an economical way for automakers to cut down on the rate of emissions because it doesn't require the design of a new powertrain. Moreover, micro hybrid vehicles are configured to implement regenerative braking technology, which converts the vehicle kinetic energy from braking into power that recharges the energy storage system, which may include batteries and capacitors. Thus, although micro hybrid vehicles may not require huge mechanical design changes, they do need improved energy storage systems than what is provided in conventional vehicles.

Figure 1:
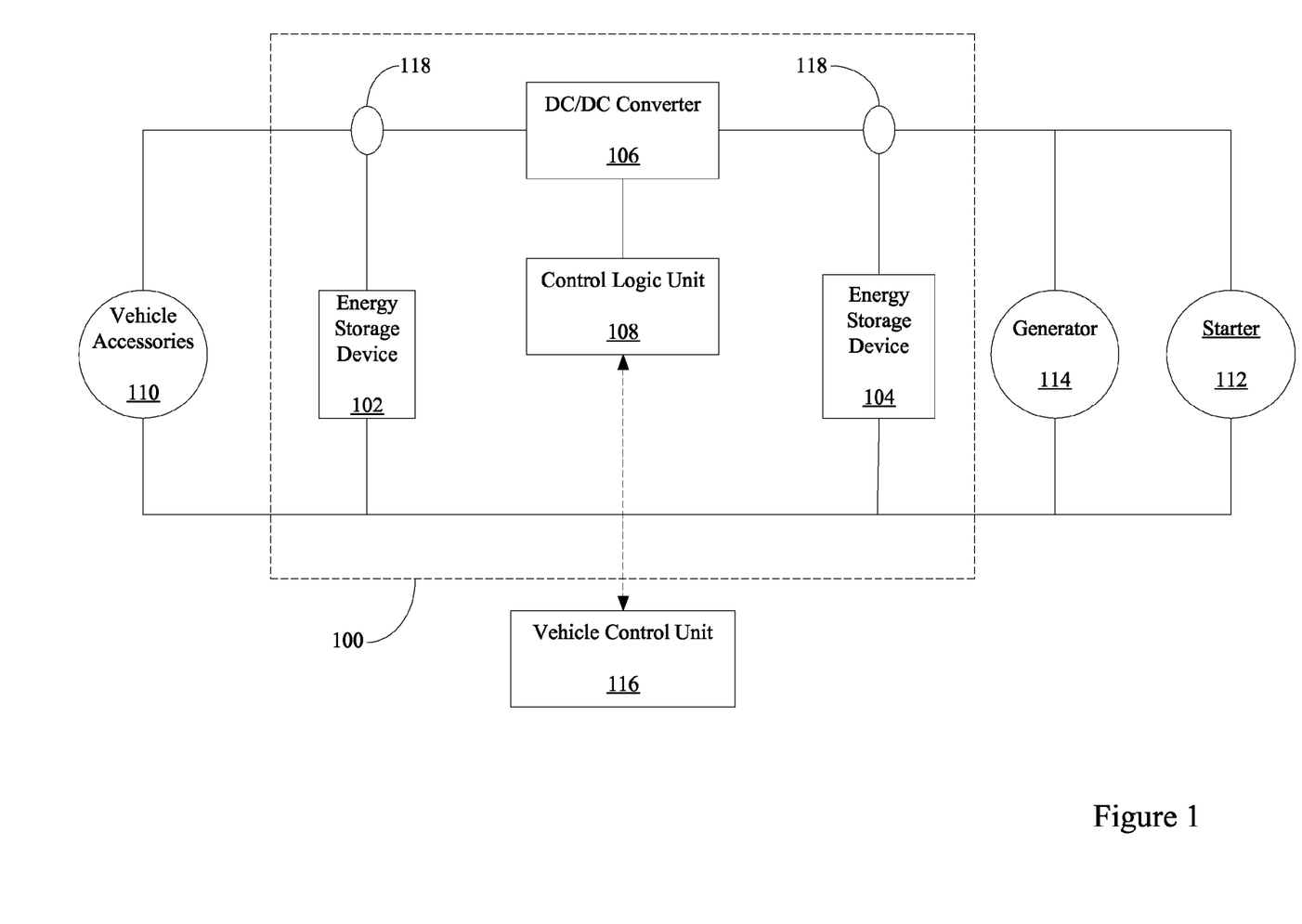
FIG. 1 is a schematic block diagram illustrating an embodiment of a dual energy storage system for micro hybrid vehicles.

Accordingly, an exemplary embodiment of an energy storage system (ESS) includes dual energy storage devices and is configured for the application in a micro hybrid vehicle, which has functions such as start stop, regeneration braking, and passive boost. As shown in FIG. 1, an ESS system 100 includes a couple of (dual) energy storage devices 102 and 104, a voltage/power regulation device 106 and a control logic unit 108. As shown, energy storage device 102 is connected to electrical accessories 110 and energy storage device 104 is connected to a starter unit 112 and a generator/motor unit 114. Alternatively, starter unit 112 and a generator/motor unit 114 can be combined into an integrated starter-generator that provides both starter and generator functions. As shown, starter unit 112 is coupled to an engine 115. Alternatively, electrical accessories 110 may be positioned between energy storage device 102 and DC/DC converter device 106. Moreover, electrical accessories 110 and energy storage device 102 may be positioned on opposite sides of DC/DC converter device 106. These different positions of energy storage device 102 within ESS 100 can support different voltages of energy storage device 102 to meet different power requirements of electrical accessories 110.

Control logic unit 108 is configured to receive voltage, current and operation mode signals from a vehicle control unit 116, and to allow ESS system 100 to operate under multiple modes, by controlling the voltage/power regulation device 106. Further, control logic unit 108 can control voltage/power regulation device 106 such that ESS 100 can provide maximum power on demand during regeneration and/or acceleration events, and provide voltage stability for loads associated with vehicle electrical accessories. Additionally, ESS system 100 includes voltage and current sensing devices 118 configured for sensing signals of currents flowing to/from energy storage devices 102 and 104, and signals of voltages across energy storage devices 102 and 104. Further, ESS system 100 can include switching units (not shown) that can serve to disconnect/decouple or connect/couple the above cited elements from one another.

Examples of dual energy storage devices 102 and 104 can be a combination of lead acid batteries, nickel metal hybrid batteries, lithium ion batteries, advanced lithium batteries, capacitors and the like. In one embodiment, energy storage device 104 can function as an energy carrier in ESS system 100, while energy storage device 102 can function as a power buffer in ESS system 100. Voltage/power regulation device 106 can be a direct current to direct current (DC to DC or DC/DC) converter device, which is configured to allow energy storage devices 102 and 104 to have different voltages and regulate the current and power flow between them. As such, DC/DC converter device 106 can provide a seamless permanent interface between energy storage devices 102 and 104 and can adapt to voltage differences between them and operate bidirectionally at different voltage ranges. In one embodiment, a voltage across energy vehicle accessories 110 (or power network associated with energy storage device 102) can be about twelve (12) volts, and a voltage across generator/motor unit 114 and starter unit 112 (or power network associated with energy storage device 104) can be between 12 and fifty (50) volts. Alternatively, any other voltage values may be applied to vehicle accessories 110 and generator/motor unit 114.

Additionally, under control inputs from control logic unit 108, DC/DC converter device 106 can couple/decouple energy storage devices 102 and 104 to/from one another based on various operation modes of the vehicle. In addition to helping DC/DC converter device 106 makes it possible not only to perform stop-start functions but also enables the micro hybrid vehicle to perform regenerative braking DC/DC converter device 106 may be a Buck converter, a Boost converter, a Buck-Boost converter, a single-ended primary-inductor converter (SEPIC), or a CUK converter (all not shown).

In one embodiment, generator/motor 114 is configured to start engine 115 and generate electrical power for the vehicle once engine 115 is in running mode. Starter unit 112 is configured to transfer electrical energy (power) to energy storage device 104 to charge it after engine 115 has been started and for capturing electrical power from the vehicle such as from regenerative braking. As stated above, energy storage device 102 is connected to electrical accessories 110 and energy storage device 104 is connected to starter unit 112 and generator/motor 114. As such, even when engine 115 is not in running mode energy storage device 102 can supply power to electrical accessories 110. Further, DC/DC converter device 106 can transfer energy between energy storage devices 102 and 104 based on their respective state of charge (SOC) values (hereafter referred to as SOC) and on control signals received from control logic unit 108, wherein the control signals are determined based the vehicle operating modes.

In addition to providing voltage, current and operation mode signals to control logic unit 108, vehicle control unit 116 communicate signals indicative of the motion state of the vehicle, such as driven, stopped, parked, etc. . . . . Further, control logic unit 108 is configured to provide information regarding SOC of energy storage devices 102 and 104, as well as operating states of starter unit 112, generator/motor unit 114, engine unit 115, DC/DC converter device 106, and vehicle accessories 110.

Figure 2:
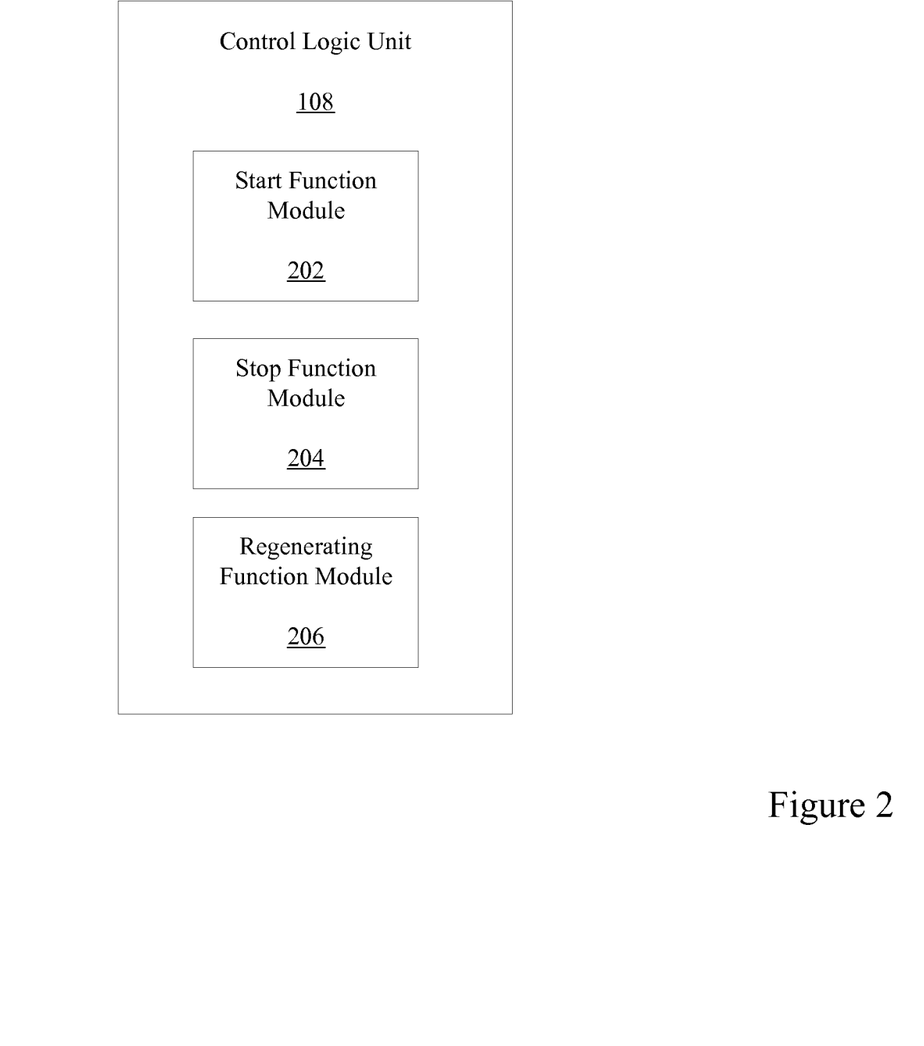
FIG. 2 is a block diagram illustrating an exemplary embodiment of a control logic unit of the dual energy storage system of FIG. 1.

Now referring to FIG. 2, in one exemplary embodiment, control logic unit 108 is includes a start function module or program 202, a stop function module 204, and a regenerating function module 206. Based on control signals received from vehicle control unit 116, control logic unit 108 is configured to implement the start, stop, and regenerating functions by providing corresponding signals to DC/DC converter device 106, energy storage devices 102 and 104, starter unit 112, and generator/motor unit 114. The start-function signal corresponds to a vehicle state in which engine unit 115 is being started. The stop-function signal corresponds to a complete stop state of the vehicle. The regenerating function signal corresponds to a vehicle state in which electrical energy is generated and stored while performing a vehicle braking event. As such, generator/motor unit 114 can generate electrical energy during the braking event to be stored in energy storage device 104 and/or energy storage device 102 depending on their respective SOCs. Both energy storage devices 102 and 104 have upper and lower limits or thresholds for their respective SOCs. For example, energy storage device 102 has preset or predetermined upper (maximum) and lower (minimum) threshold values SOC1_max and SOC1_min, respectively. Similarly, energy storage device 104 has predetermined maximum and minimum threshold values SOC2_max and SOC2_min, respectively.

The engine stop function involves starter unit 112 turning off engine 115 when vehicle control unit 116 determines that the vehicle has come to a complete stop. Moreover, energy storage device 104 provides electrical energy to starter unit 112 to restart engine 115 when it is desired for the vehicle to move again (e.g., vehicle to come out of halt in traffic), and generator/motor unit 114 can charge energy storage device 114 after engine 115 had been restarted and while the vehicle is being driven.

As discussed above, vehicle control unit 116 provides particular signals to control logic unit 108 based on detected vehicle operation modes, each of which can determine a different operation scheme of ESS 100. These vehicle operation modes include, but are not limited to, a charge mode, a discharge mode, a cranking mode, and a key-off mode. These vehicle operation modes are implemented in ESS 100 to provide a control strategy that maximizes charge acceptance for fuel economy benefits and provide voltage stabilization for accessory load in a micro hybrid vehicle.

In accordance with one exemplary embodiment, during a charge mode such as a regenerative braking state or a charging mode when a level of the SOC of energy storage device 102 falls below a predetermined low threshold value SOC1_low, control logic unit 108 is configured to turn off/on DC/DC converter device 106 depending on the SOC of energy storage device 104. During operation, when the SOC of energy storage device 104 is lower than a predetermined value SOC2_1, control logic unit 108 is configured to trigger a regeneration of energy storage device 104 and to use energy storage device 102 to provide electrical energy to vehicle accessories 110. Further, when the SOC of energy storage device 104 is higher than a predetermined value SOC2_2, control logic unit 108 is configured to trigger a regeneration of both energy storage devices 102 and 104, while providing electrical energy to vehicle accessories 110. Values of predetermined values SOC2_1 and SOC2_2 are located with a value range defined by max and min values SOC2_max and SOC2_min, and predetermined value SOC2_1 is greater than predetermined value SOC2_2.

In accordance with one exemplary embodiment, during a discharge mode, control logic unit 108 is configured to turn off/on DC/Dc converter device 106 depending on the SOC of energy storage device 104. During operation, when the SOC of energy storage device 104 is higher than a predetermined value SOC2_3, control logic unit 108 is configured to regulate DC/DC converter 106 such that electrical energy from energy storage device 104 is provided for charging purposes to energy storage device 102 through DC/DC converter 106, while providing electrical energy to vehicle accessories 110. Further, when SOC of energy storage device 104 is lower than a predetermined value SOC2_4, control logic unit 108 is configured to will deactivate DC/DC converter 106 such that energy storage device 104 is disconnected from energy storage device 102, while providing electrical energy from energy storage device 102 alone to vehicle accessories 110.

In accordance with one exemplary embodiment, during a cranking mode control logic unit 108 is configured to deactivate DC/DC converter 106 and to disconnect or uncouple energy storage device 102 and 104 from each other. In this uncoupling state, control logic unit 108 enables energy storage device 102 to provide electrical energy to vehicle accessories 110, and energy storage device 104 to provide alone cranking power to starter unit 112. Further, upon detection of a cranking failure, control logic unit 108 is configured to activate DC/DC converter 106 to connect or couple energy storage devices 102 and 104 so that energy storage device 102 can provide electrical energy to charge and raise the charge level of energy storage device 104 for the next cranking attempt.

In accordance with one exemplary embodiment, during a key-off mode, upon determination that the SOC of energy storage device 104 is greater than the predetermined value SOC2_3 control logic unit 108 is configured to activate and regulate DC/DC converter 106 to connect energy storage devices 102 and 104 to each other so that energy storage device 104 may provide electrical energy and charge energy storage device 102. Further, upon determination that the SOC of energy storage device 104 is less than the predetermined value SOC2_4 control logic unit 108 is configured to deactivate DC/DC converter 106 in order to disconnect energy storage devices 102 and 104 from each other.

Figure 3:
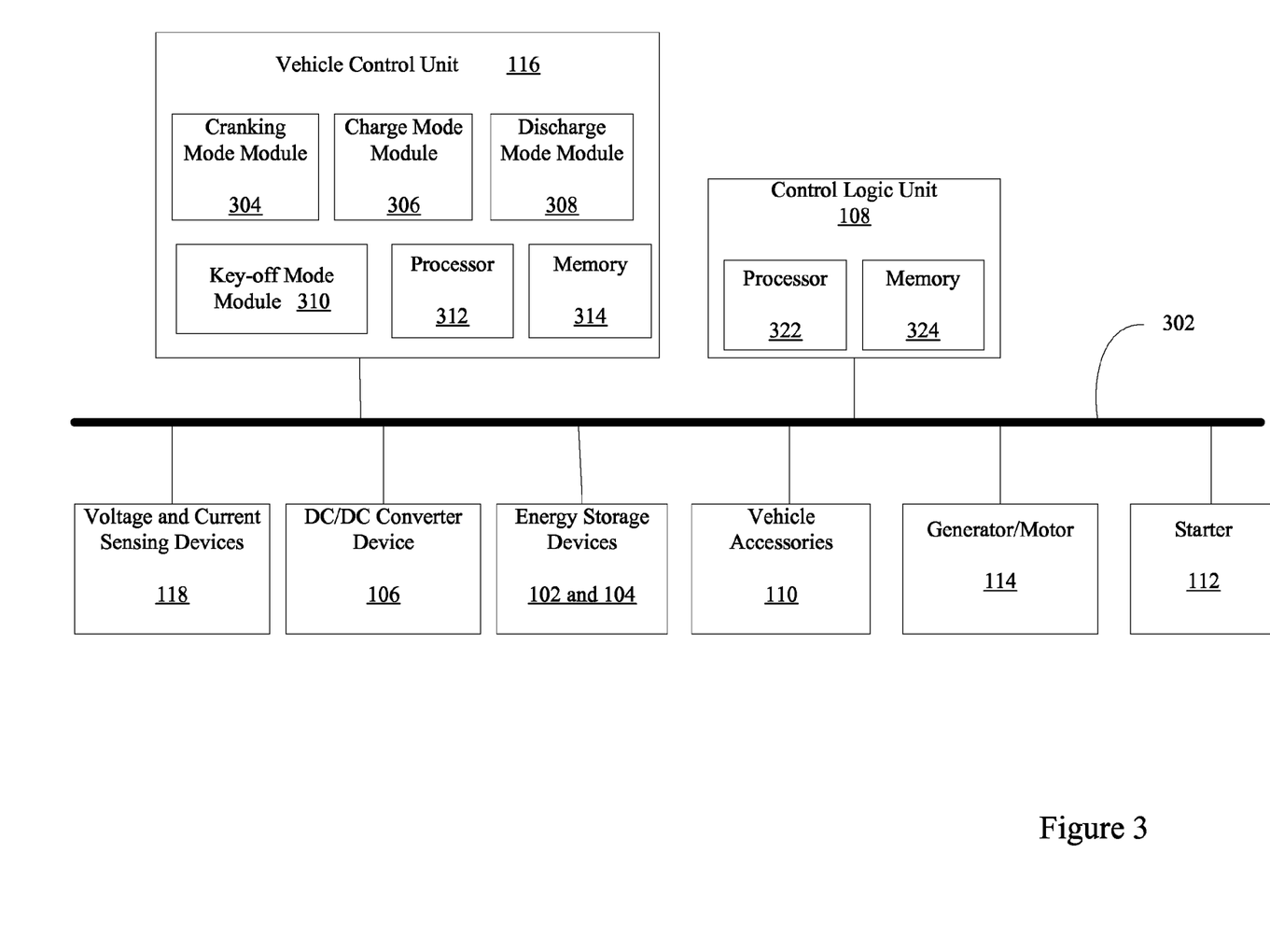
FIG. 3 is a schematic block diagram illustrating a communication circuit coupling the various components/devices of the dual energy storage system of FIG. 1.

Now referring to FIG. 3, an exemplary embodiment of a communication circuit 300 coupling the various components/devices of ESS 100 is shown. As shown, vehicle control unit 116 is connected to a communication bus 302 to which are connected control logic unit 108, DC/Dc converter device 106, energy storage devices 102 and 104, vehicle accessories 110, and sensing devices 118. As stated above, the modes of operation of the vehicle are determined by vehicle control unit 116. As such, to implement the corresponding operation schemes of ESS 100, control logic unit 108 receives via communication bus 302 suitable control signals from vehicle control unit 116 and SOC signals from energy storage devices 102 and 104, as well as transmits control signals to DC/DC converter device 106, and starter unit 112, and generator/motor 114.

As shown in FIG. 3, vehicle control unit 116 includes a cranking mode module or program 304, a charge mode module 306, a discharge mode module 308, a key-off module 310, a processing unit 312, and a memory unit 314 coupled to processing unit 312. Further, as shown, control logic unit 108 includes a processing unit 322, and a memory unit 324 coupled to processing unit 322.

Each of processing units 312 and 322 can be implemented on a single-chip, multiple chips or multiple electrical components. For example, various architectures can be used including dedicated or embedded processor or microprocessor ($\mu P$), single purpose processor, controller or a microcontroller ($\mu C$), digital signal processor (DSP), or any combination thereof. In most cases, each of processing units 312 and 322 together with an operating system operates to execute computer code and produce and use data. Each of memory units 314 and 324 may be of any type of memory now known or later developed including but not limited to volatile memory (such as RAM), non-volatile memory (such as ROM, flash memory, etc.) or any combination thereof, which may store software that can be accessed and executed by processing units 312 and 322, respectively, for example.

Figure 4:
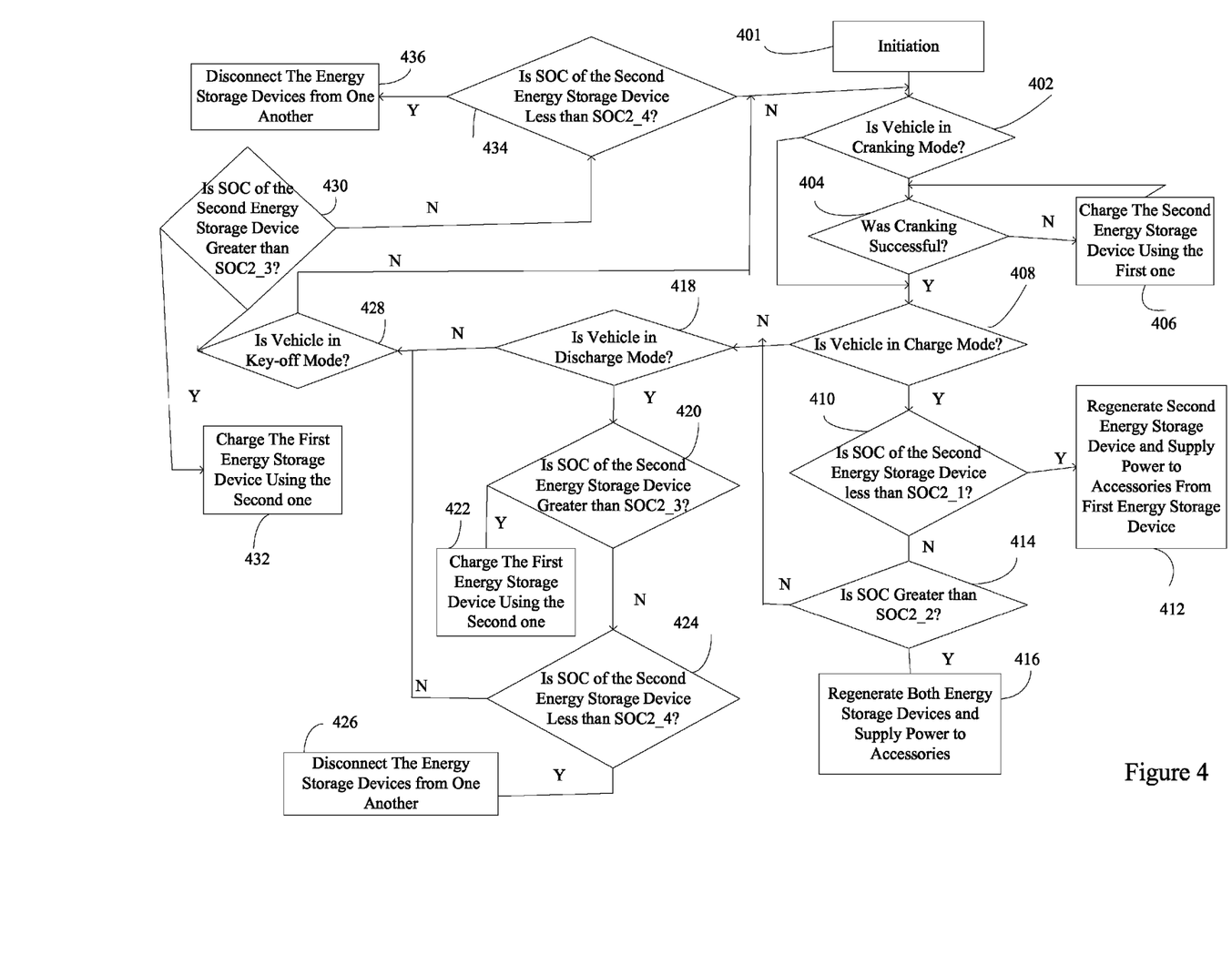
FIG. 4 is a flow chart illustrating an example embodiment of a method for managing energy of the a dual energy storage system of FIG. 1.

Now referring next to FIG. 4, a flow diagram shows an exemplary method 400, initiated at Step 401, for implementing and managing the different operation schemes of ESS 100. At step 402, control logic unit 108 is configured to determine whether the vehicle is in a cranking mode based on instructive signals received from vehicle control unit 116. In the affirmative, subsequently to the cranking event, control logic unit 108 determines whether the cranking was successful, at step engine 404. In case the cranking was found to be unsuccessful, control logic unit 108 is configured to activate DC/DC converter 106 such that energy storage device 102 may provide electrical energy to energy storage device 104 for the next cranking attempt, at step 406. In the negative, control logic unit 108 determines whether the vehicle is in a charge mode, at step 408. If so, control logic unit 108 determines whether the SOC of energy storage device 104 is lower than the predetermined value SOC2_1, at step 410. In the affirmative, control logic unit 108 is configured to trigger a regeneration of energy storage device 104 and to use energy storage device 102 to provide electrical energy to vehicle accessories 110, at step 412. Otherwise, if the SOC of energy storage device 104 is found to be higher than the predetermined value SOC2_2, at step 414, control logic unit 108 is configured to trigger a regeneration of both energy storage devices 102 and 104, while providing electrical energy to vehicle accessories 110, at step 416. If the vehicle is not in a charge mode, control logic unit 108 determines whether the vehicle is in a discharge mode, at step 418. If so, control logic unit 108 determines whether the SOC of energy storage device 104 is higher than the predetermined value SOC2_3, at step 420. In the affirmative, control logic unit 108 is configured to regulate DC/DC converter 106 such that electrical energy from energy storage device 104 is provided for charging purposes to energy storage device 102 through DC/DC converter 106, while providing electrical energy to vehicle accessories 110, at step 422. Otherwise, control logic unit 108 checks whether the SOC of energy storage device 104 is lower than a predetermined value SOC2_4, at step 424. If so, control logic unit 108 deactivates DC/DC converter 106 such that energy storage device 104 is disconnected from energy storage device 102, at step 426. Otherwise, control logic unit 108 determines whether the vehicle is in a key-off mode, at step 428. If so, control logic unit 108 determines whether the SOC of energy storage device 104 is higher than the predetermined value SOC2_3, at step 430. In the affirmative, control logic unit 108 is configured to regulate DC/DC converter 106 such that electrical energy from energy storage device 104 is provided for charging purposes to energy storage device 102 through DC/DC converter 106, while providing electrical energy to vehicle accessories 110, at step 432. Otherwise, control logic unit 108 checks whether the SOC of energy storage device 104 is lower than a predetermined value SOC2_4, at step 434. If so, control logic unit 108 deactivates DC/DC converter 106 such that energy storage device 104 is disconnected from energy storage device 102, at step 436.

As known to one of ordinary skill in the art, DC/DC converters typically utilizes a pulse width modulation to regulate voltage and current signals in accordance with the needs or properties of a load. In one exemplary embodiment, depending on the power capabilities of energy storage devices 102 and 104, DC/DC converter 106 may enable the following operating states energy storage devices 102 and 104 through a plurality of pulse width modulation (PWM) schemes:

1. Both energy storage devices 102 and 104 operate at their maximum power capability, such that the power capability of the ESS 100 operates at its maximum.
2. Energy storage device 104 can operate at its maximum power capability, while energy storage device 102 can operates at fraction of its maximum power capability.
3. Both energy storage devices 102 and 104 operate at fractions of their maximum power capabilities.

Figure 5:
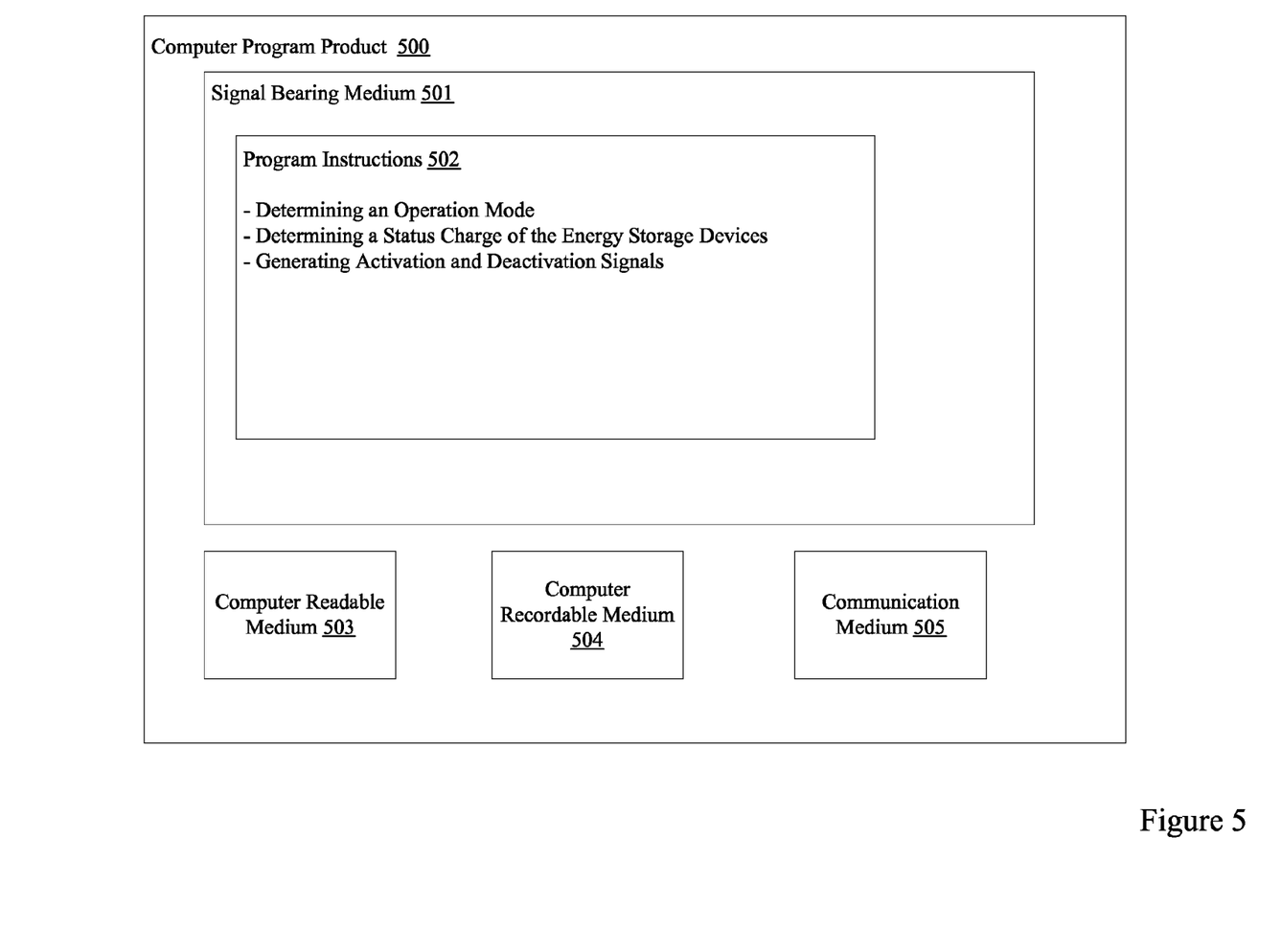
FIG. 5 is a schematic diagram illustrating a conceptual partial view of an example computer program product.

In some embodiments, the disclosed method may be implemented as computer program instructions encoded on a computer-readable storage media in a machine-readable format. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more programming instructions 502 that, when executed by a processing unit may provide functionality or portions of the functionality described above with respect to FIGS. 1-4. Thus, for example, referring to the embodiment shown in FIG. 4, one or more features of blocks 402-422, may be undertaken by one or more instructions associated with the signal bearing medium 501.

In some examples, signal bearing medium 501 may encompass a non-transitory computer-readable medium 503, such as, but not limited to, a hard disk drive, memory, etc. In some implementations, the signal bearing medium 501 may encompass a computer recordable medium 504, such as, but not limited to, memory, read/write (R/W) CDs, R/W DVDs, etc. In some implementations, signal bearing medium 501 may encompass a communications medium 505, such as, but not limited to, a digital and/or an analog communication medium (e.g., a fiber optic cable, a waveguide, a wired communications link, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. An energy storage system of a vehicle, comprising:
    a first energy storage device configured to couple to one or more electrical accessories of the vehicle;
    a second energy storage device configured to couple to one or more of a starter unit, generator, or motor of the vehicle;
    a voltage and current regulator device coupled to the first energy storage device and the second energy storage device configured to transfer electrical energy bidirectionally between the first energy storage device and second energy storage device;
    a control unit for controlling the voltage and current regulator device, wherein the control unit is configured to receive a signal based on an operation mode of the vehicle from a vehicle control unit; and
    a plurality of sensing devices for sensing current input signals and voltage input signals to the first energy storage device, the second energy storage device, or both;
    wherein the control unit is configured to recharge the second energy storage device and power the one or more electrical accessories of the vehicle with the first energy storage device when:
  the operation mode is in a charging mode; and
  a state of charge of the second energy storage device is less than a first predetermined threshold value;
wherein the control unit is configured to recharge the first energy storage device and the second energy storage device and power the one or more electrical accessories with the generator when:
  the operation mode is in the charging mode;
  the state of charge of the second energy storage device is greater than or equal to the first predetermined threshold value; and
  the state of charge of the second energy storage device is greater than a second predetermined threshold value;
wherein the control unit is configured to connect the first energy storage device to the second energy storage device, charge the first energy storage device with the second energy storage device, and power the one or more accessories with the second energy storage device when:
  the operation mode is in a key-off mode; and
  the state of charge of the second energy storage device is greater than a third predetermined threshold value;
wherein the control unit is configured to disconnect the first energy storage device from the second energy storage device when:
  the operation mode is in the key-off mode;
  the state of charge of the second energy storage device is less than or equal to the third predetermined threshold value; and
  the state of charge of the second energy storage device is less than a fourth predetermined threshold value.

2. The energy storage system of claim 1, wherein the voltage and current regulator device is configured to adjust a transfer of electrical energy between the first energy storage device and the second energy storage device through a pulse width modulation.

3. The energy storage system of claim 1, wherein a power source associated with the vehicle provides charge power to the first energy storage device, the second energy storage device, or both based on the operation mode of the energy storage system.

4. The energy storage system of claim 1, wherein the control unit is configured to control both the first energy storage device and the second energy storage device to supply electrical power to the one or more electrical accessories of the vehicle.

5. The energy storage system of claim 1, wherein the control unit is configured to control the second energy storage device to provide cranking power to an engine of the vehicle.

6. The energy storage system of claim 1, wherein the control unit is configured to control the voltage and current regulator device such that both the first energy storage device and the second energy storage device operate near or at their respective maximum power levels.

7. The energy storage system of claim 1, wherein the control unit is configured to control the voltage and current regulator device such that the second energy storage device operates near or at a corresponding maximum power level and the first energy storage device operates at a fraction of a corresponding maximum power level.

8. The energy storage system of claim 1, wherein the control unit is configured to control the voltage and current regulator device such that both the first energy storage device and the second energy storage device operate at a fraction of their respective maximum power levels.

9. The energy storage system of claim 1, wherein the vehicle includes a dual power network such that a voltage input to the one or more electrical accessories of the vehicle is approximately equal to a first voltage level and a voltage input to an electric generator is between the first voltage level and a second voltage level.

10. The energy storage system of claim 9, wherein the first voltage level is about 12 volts and the second voltage level is about 50 volts.

11. The energy storage system of claim 1, wherein the first energy storage device, the second energy storage device, the voltage and current regulator device, the control unit, and the plurality of sensing devices are configured for a micro hybrid application.

12. The energy storage system of claim 1, wherein the voltage and current regulator device is a DC/DC converter.

13. The energy storage system of claim 1, wherein the control unit is configured to cause the voltage and current regulator device to transfer electrical energy from the first energy storage device to the second energy storage device.

14. The energy storage system of claim 1, wherein the control unit is configured to cause the voltage and current regulator device to couple the first energy storage device to the second energy storage device after receiving an indication of a cranking failure, wherein the first energy storage device provides electrical energy to raise a charge of the second energy storage device for a next cranking attempt.

15. An energy storage system of a vehicle, comprising:
  a first energy storage device coupled to one or more electrical accessories of the vehicle;
  a second energy storage device coupled to an electrical generator;
  a voltage and current regulator device configured to couple the first energy storage device to the second energy storage device, wherein the voltage and current regulator device is configured to transfer electrical energy from the first energy storage device to the second energy storage device;
  a control unit for controlling the voltage and current regulator device, wherein the control unit is configured to receive a signal based on an operation mode of the vehicle from a vehicle control unit; and
  a plurality of sensing devices for sensing current input signals and voltage input signals to the first energy storage device, the second energy storage device, or both;
  wherein the control unit is configured to charge the first energy storage device with the second energy storage device and power the one or more electrical accessories with the second energy storage device when:
    the operation mode is in a discharge mode; and
    a state of charge of the second energy storage device is greater than a first predetermined threshold value;
  wherein the control unit is configured to disconnect the first energy storage device and the second energy storage device when:
    the operation mode is in a discharge mode;
    the state of charge of the second energy storage device is less than or equal to the first predetermined threshold value; and
    the state of charge of the second energy storage device is less than a second predetermined threshold value;
  wherein the control unit is configured to connect the first energy storage device to the second energy storage device, charge the first energy storage device with the second energy storage device, and power the one or more accessories with the second energy storage device when:
the operation mode is in a key-off mode; and
the state of charge of the second energy storage device is greater than the first predetermined threshold value;
wherein the control unit is configured to disconnect the first energy storage device and the second energy storage device when:
the operation mode is in the key-off mode;
the state of charge of the second energy storage device is less than or equal to the first predetermined threshold value; and
when the state of charge is less than the second predetermined threshold value.

16. The energy storage system of claim 15, wherein the operation mode comprises a cranking mode, a charge mode, the discharge mode, or the key-off mode.

17. The energy storage system of claim 16, wherein during the cranking mode, the control unit is configured to deactivate the voltage and current regulator device and disconnect the first energy storage device from the second energy storage device.

18. The energy storage system of claim 16, wherein during the charge mode, the control unit is configured to utilize the first energy storage device, the second energy storage device, or both for regenerating power.

* * * * *